US010654623B2

(12) United States Patent
Circosta et al.

(10) Patent No.: US 10,654,623 B2
(45) Date of Patent: May 19, 2020

(54) BOTTLE WITH DRINK-THROUGH CAP

(71) Applicant: Can't Live Without It, LLC, New York, NY (US)

(72) Inventors: Michael Circosta, Brooklyn, NY (US); Clay Burns, New York, NY (US); Adriana Kliegman, New York, NY (US); James Best, Hewitt, NJ (US)

(73) Assignee: CAN'T LIVE WITHOUT IT, LLC, New York, NY (US)

( * ) Notice: Subject to any disclaimer, the term of this patent is extended or adjusted under 35 U.S.C. 154(b) by 0 days.

(21) Appl. No.: 15/715,563

(22) Filed: Sep. 26, 2017

(65) Prior Publication Data

US 2019/0092535 A1 Mar. 28, 2019

(51) Int. Cl.
| | |
|---|---|
| *B65D 41/04* | (2006.01) |
| *B65D 47/08* | (2006.01) |
| *B65D 43/26* | (2006.01) |
| *B65D 43/02* | (2006.01) |
| *B65D 47/32* | (2006.01) |
| *B65D 47/30* | (2006.01) |
| *F16K 1/22* | (2006.01) |

(Continued)

(52) U.S. Cl.
CPC ..... *B65D 41/0485* (2013.01); *B65D 43/0208* (2013.01); *B65D 43/265* (2013.01); *B65D 47/08* (2013.01); *B65D 47/30* (2013.01); *B65D 47/32* (2013.01); *A47G 19/2272* (2013.01); *B65D 47/24* (2013.01); *B65D 2205/02* (2013.01); *F16K 1/221* (2013.01)

(58) Field of Classification Search
CPC ............... B65D 41/0485; B65D 47/32; B65D 43/0208; B65D 43/265; B65D 47/08; B65D 47/24; B65D 39/02; B65D 39/025; B65D 47/006; A47G 19/2272; F16K 1/221
See application file for complete search history.

(56) References Cited

U.S. PATENT DOCUMENTS 5,820,465 A * 10/1998 Vogl ........................ F16D 7/046
464/36
5,873,494 A * 2/1999 Dallas, Jr. .......... B65D 47/2006
222/129

(Continued)

FOREIGN PATENT DOCUMENTS

| CN | 103129824 | 6/2013 |
| CN | 103201185 | 7/2013 |

(Continued)

OTHER PUBLICATIONS http://www.oxo.com/products/beverage/barware/steel-wine-stopper-pourer-combination, 3 pages, accessed on May 3, 2017.

(Continued)

*Primary Examiner* — Ernesto A Grano
(74) *Attorney, Agent, or Firm* — Kilpatrick Townsend & Stockton LLP

(57) ABSTRACT

A beverage bottle may include a vessel portion configured to contain fluid. The vessel portion may include an open end and a closed end. A cap may be configured to mate to the open portion of the vessel portion. The cap may include a butterfly valve configured to prevent the fluid from exiting the bottle when in a closed position and to enable the fluid to exit the beverage bottle when in an open position.

17 Claims, 10 Drawing Sheets

(51) Int. Cl.
  *A47G 19/22* (2006.01)
  *B65D 47/24* (2006.01)

(56) References Cited

U.S. PATENT DOCUMENTS

| | | | | |
|---|---|---|---|---|
| 5,931,357 | A * | 8/1999 | Wass | B65D 47/261 |
| | | | | 222/554 |
| 6,029,866 | A * | 2/2000 | Wood | B29C 45/1676 |
| | | | | 215/235 |
| D426,158 | S * | 6/2000 | Flurer | D9/449 |
| 6,564,978 | B1 * | 5/2003 | Safian | B65D 47/2006 |
| | | | | 222/533 |
| 6,691,394 | B1 * | 2/2004 | McClean | B65D 47/2006 |
| | | | | 222/534 |
| 6,763,964 | B1 | 7/2004 | Hurlbut et al. | |
| 6,886,707 | B2 | 5/2005 | Giraud | |
| 6,889,859 | B1 | 5/2005 | Leon | |
| 6,896,160 | B2 * | 5/2005 | Kaufman | B65D 47/2006 |
| | | | | 215/235 |
| 7,073,678 | B1 | 7/2006 | Dibdin et al. | |
| D547,605 | S * | 7/2007 | Edelstein | D7/392.1 |
| D563,723 | S * | 3/2008 | Gluck | D7/396.2 |
| 7,686,182 | B1 | 3/2010 | Shukri | |
| 8,393,487 | B1 * | 3/2013 | Pillers | B65D 51/16 |
| | | | | 220/253 |
| D696,942 | S * | 1/2014 | Kim | D9/447 |
| D696,943 | S * | 1/2014 | Kim | D9/447 |
| 8,936,170 | B2 * | 1/2015 | Dyer | B65D 47/20 |
| | | | | 220/254.3 |
| 8,978,923 | B2 | 3/2015 | George | |
| 9,027,774 | B2 * | 5/2015 | Palmer | B65D 47/0857 |
| | | | | 215/320 |
| D732,964 | S * | 6/2015 | Dyer | D7/392.1 |
| D756,773 | S * | 5/2016 | Brannock | D9/438 |
| 9,346,200 | B2 | 5/2016 | Desoto-Burt et al. | |
| D758,792 | S * | 6/2016 | Karussi | D7/392.1 |
| 9,364,110 | B2 | 6/2016 | George | |
| 9,463,910 | B2 | 10/2016 | Schandl | |
| 9,521,918 | B2 | 12/2016 | Coon et al. | |
| D777,032 | S * | 1/2017 | Buck | D9/447 |
| D784,072 | S * | 4/2017 | Baron | D7/392.1 |
| 9,643,758 | B2 | 5/2017 | George | |
| 9,820,594 | B2 * | 11/2017 | Bower | A47G 19/2261 |
| D806,469 | S * | 1/2018 | Palmer | D7/392.1 |
| 9,914,567 | B2 * | 3/2018 | Brem | B65D 43/02 |
| 10,351,313 | B2 | 7/2019 | George | |
| 2002/0162983 | A1 | 11/2002 | Bailey | |
| 2005/0127076 | A1 * | 6/2005 | Law | A47G 19/2272 |
| | | | | 220/254.1 |
| 2007/0170184 | A1 * | 7/2007 | Canedo | A45F 3/18 |
| | | | | 220/254.9 |
| 2011/0278315 | A1 * | 11/2011 | Bower | A47G 19/2272 |
| | | | | 220/703 |
| 2012/0080441 | A1 * | 4/2012 | Lin | B65D 47/06 |
| | | | | 220/810 |
| 2012/0241453 | A1 * | 9/2012 | Palmer | B65D 47/043 |
| | | | | 220/254.3 |
| 2014/0361011 | A1 | 12/2014 | Dyer et al. | |
| 2015/0201777 | A1 * | 7/2015 | Kim | A47G 19/2272 |
| | | | | 220/713 |
| 2015/0230639 | A1 * | 8/2015 | Palmer | A47G 19/2272 |
| | | | | 222/545 |
| 2018/0346210 | A1 * | 12/2018 | Jelich | B65D 47/2006 |
| 2019/0283939 | A1 | 9/2019 | George | |

FOREIGN PATENT DOCUMENTS

| | | |
|---|---|---|
| EM | 001378038-0006 | 7/2013 |
| EM | 003319144-0001 | 7/2016 |
| KR | 300664419 | 10/2012 |

OTHER PUBLICATIONS https://www.ali.express.com/item/50pcs-lot-60ml-Green-Pet-Container-60ml-Liquid-Cream-Container-With-Disk-Cap-2oz-shampoo-bottle/32707792452.html?. . . , 4 pages, accessed on May 3, 2017.
https://www.oxo.com/products/preparing/fruit-vegetable-tools/salad-dressing-shaker-green-1138, 4 pages, accessed on May 3, 2017.
CN201711420386.1, "Office Action," Nov. 28, 2019, 10 pages (4 pages of English translation; 10 pages of Chinese translation).

* cited by examiner

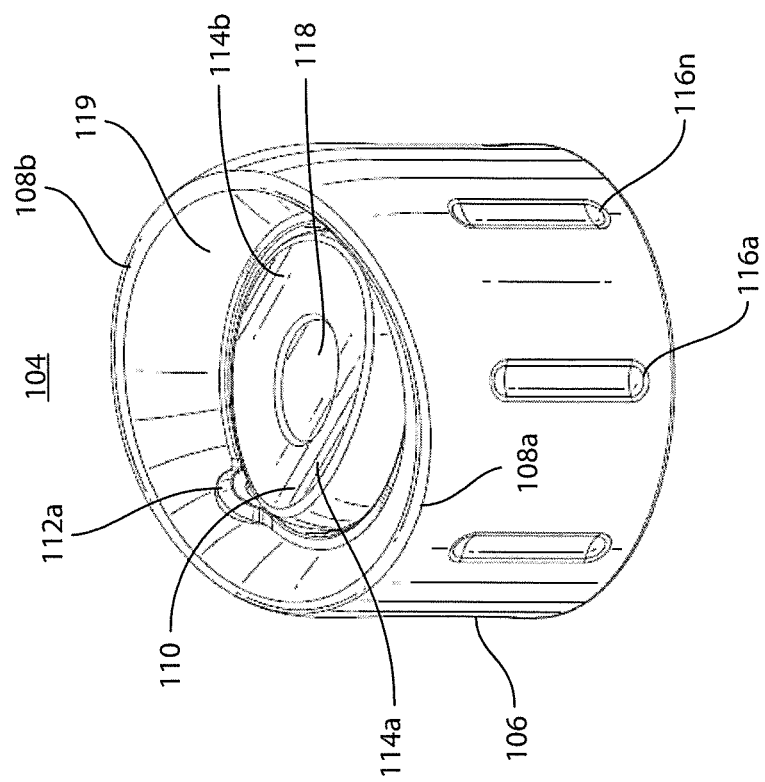
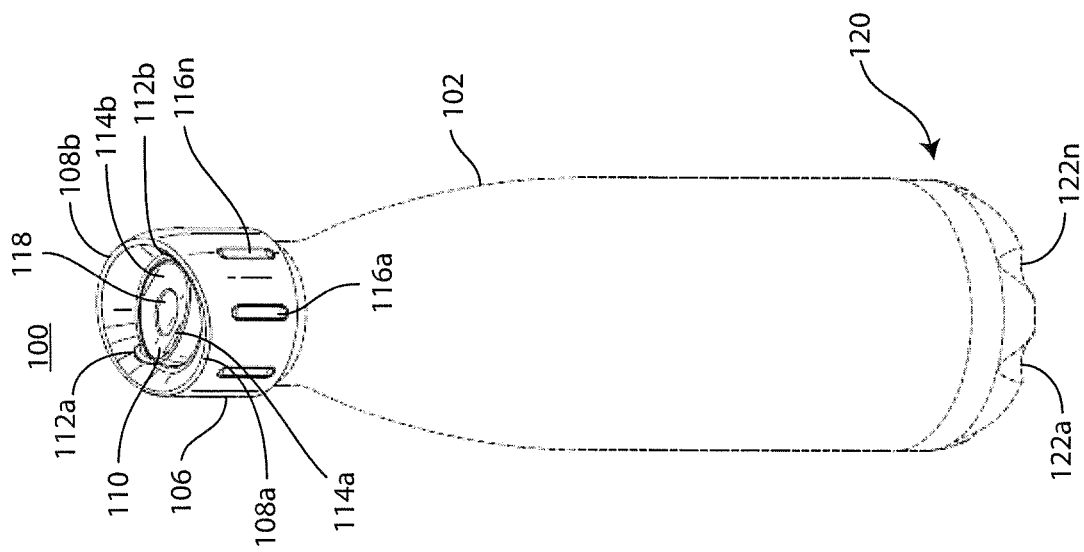

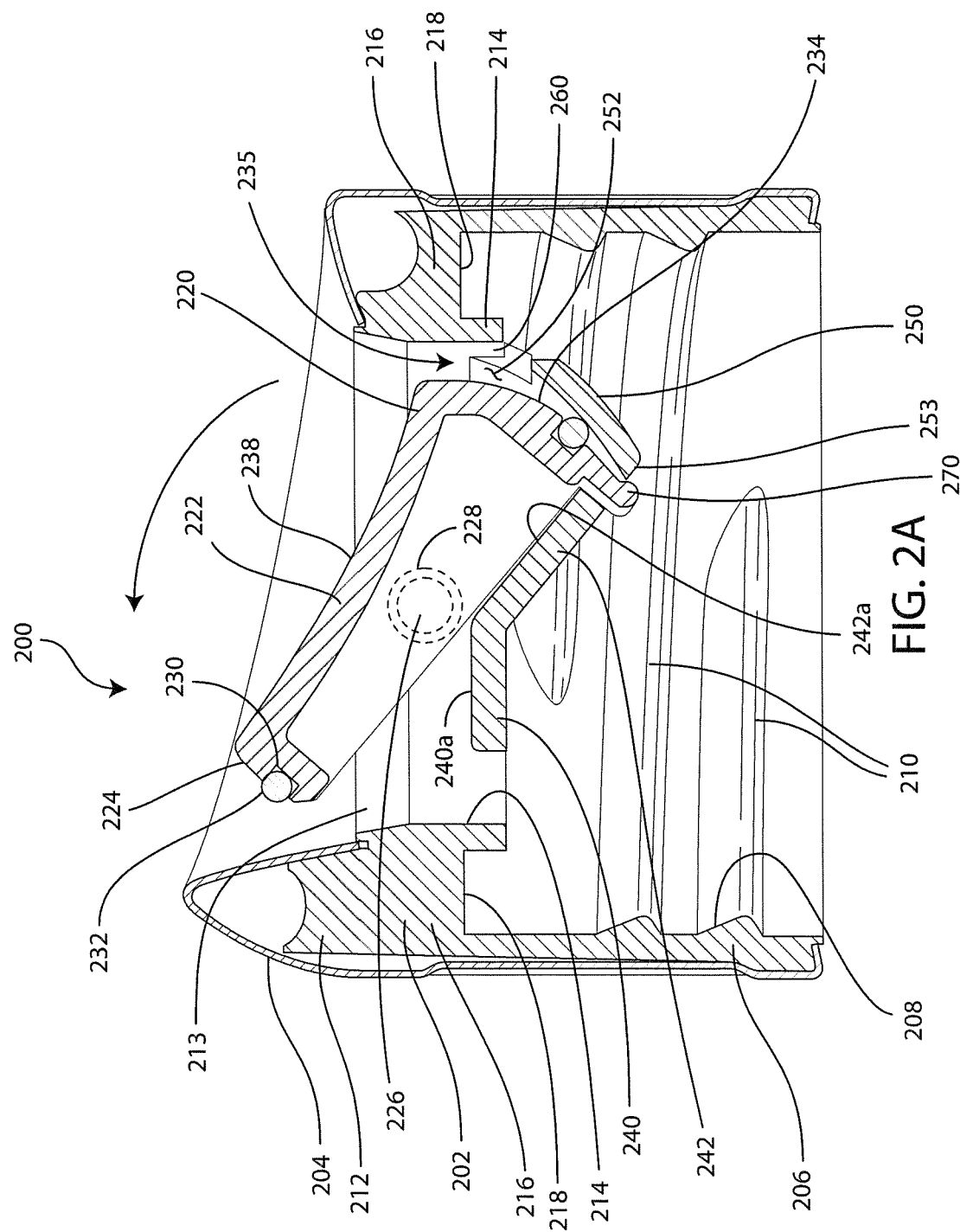

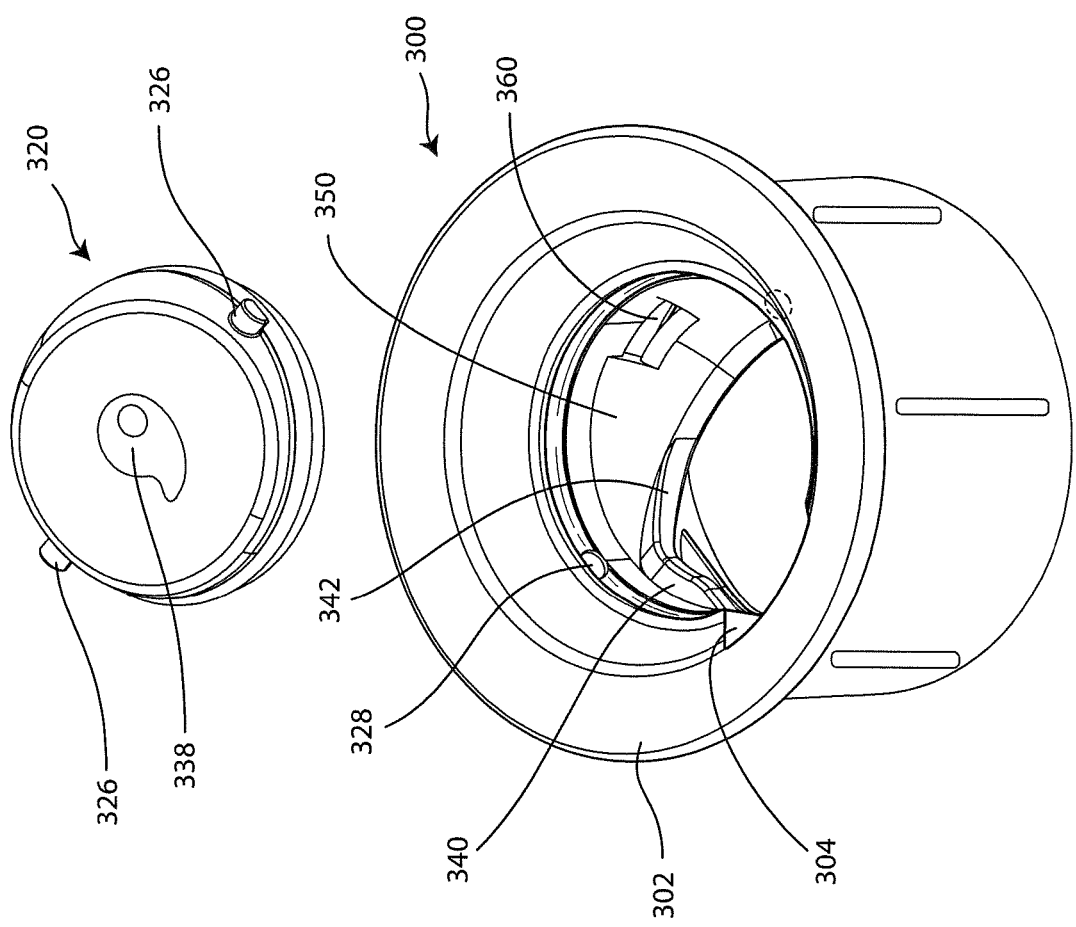
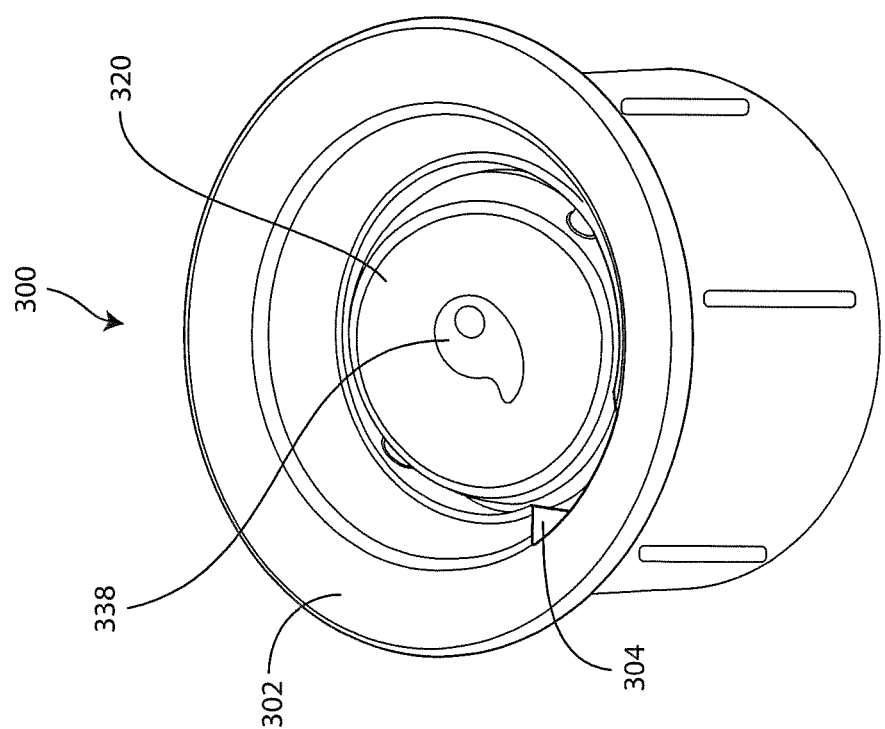
FIG. 3B
FIG. 3A

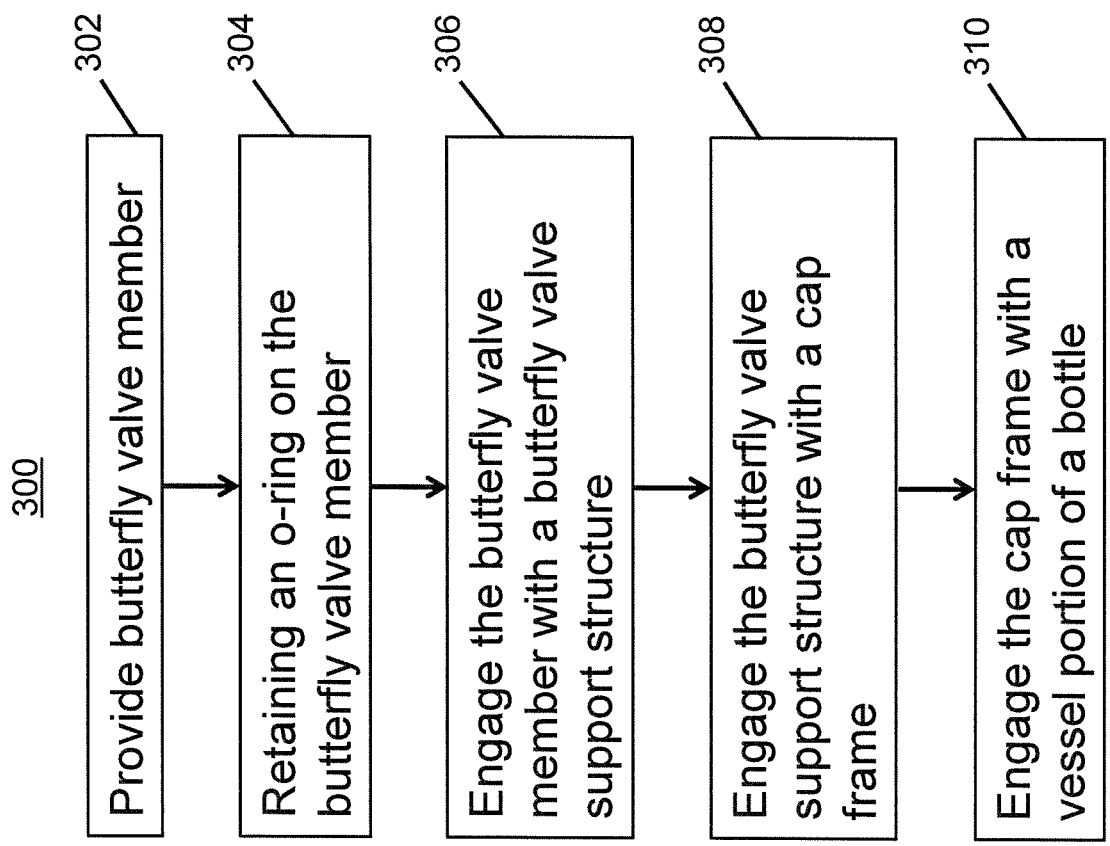

BOTTLE WITH DRINK-THROUGH CAP

BACKGROUND

The present disclosure generally relates to vessels for containing liquids and caps for the vessels. More specifically, the disclosure relates to technologies for caps for vessels such as bottles, canisters, and flasks.

Bottles are very common drinking vessels, and are particularly useful for individuals to transport fluids, such as water, coffee, and sports drinks. However, carrying and drinking from bottles can sometimes pose challenges for the user. Many bottles have caps that are screw-thread caps, especially those bottles that provide thermal insulation. One problem with such screw-thread caps is that two hands are generally needed to unscrew the cap, which makes it difficult or inconvenient when performing activities, including hiking or other activities, in which having a free hand is not always possible. Some bottle caps provide for drink-through configurations, but have limitations, including being complex to manufacture and being difficult to clean due to a conduit through which fluid exits being small or otherwise difficult to access.

SUMMARY OF THE DISCLOSURE

Disclosed herein are technologies to provide caps for liquid containing vessels such as bottles, canisters, and flasks which facilitate single-handed access to the contents of the vessels while providing a sealing function.

In accordance with principles disclosed herein, a cap of a beverage bottle may include a butterfly valve that selectively permits fluid to exit the bottle, provides good insulation, supports a wide opening, and is configured to be operated by a single hand of a user. The cap may include a sip region on a front or foreword side of the cap. A lip of the cap may be angled such that a back or rear side is lower than the front or forward side. The back side may be aligned with a control side (non-pour side) of the butterfly valve so that a user may more easily open the butterfly valve using a single hand and pour fluid from the bottle through the opposite, front side of the bottle. A top surface of the valve may be below the back side of the lip to minimize the chance of inadvertently opening of the valve. In an embodiment, the butterfly valve may be configured to extend across an entire opening of a vessel portion of the bottle, and pivot substantially across a center region of the opening. An o-ring surrounding the butterfly valve may be colored such that the o-ring is visible when the valve is in an open position, thereby easily enabling the user to recognize that the lid is open. A splash guard may be configured below the butterfly valve to prevent liquid from spilling over the top of the valve during drinking. A vent hole may be included to aid smooth drinking. Pivot stops and detents may be included to define the open and closed positions.

One embodiment of a beverage bottle may include a vessel portion configured to contain fluid. The vessel portion may include an open end and a closed end. A cap may be configured to mate to the open portion of the vessel portion. The cap may include a butterfly valve configured to prevent the fluid from exiting the bottle when in a closed position and to enable the fluid to exit the beverage bottle directly into the user's mouth when in an open position.

One embodiment of a cap for drinking a beverage from a vessel may be configured to mate with the opening of a beverage-holding vessel, the cap including a butterfly valve configured to prevent fluid from exiting the vessel when in a closed positions and to enable fluid to exit the vessel when in an open position.

One embodiment of a method of manufacturing a bottle may include providing a butterfly valve member having a top side, a bottom side, and a sidewall extending between the top and bottom sides, where the sidewall may include a groove that encircles the perimeter of the butterfly valve member. An o-ring may be retained in the groove of the butterfly valve member. The butterfly valve member may be engaged with a butterfly valve support structure. The butterfly valve support structure may be engaged with a cap frame.

In an embodiment, a beverage bottle, comprises: (a) a vessel portion configured to contain fluid, the vessel portion including an open end and a closed end; and (c) a cap configured to mate to the open portion of the vessel portion, the cap including an opening and a butterfly valve within the opening to prevent the fluid from exiting the bottle when in a closed position and to enable the fluid to exit the beverage bottle when in an open position.

In an embodiment: the cap includes an inner sidewall defining the opening, and the butterfly valve includes a disc shaped member having a top surface, a sidewall with peripheral surface, a groove extending along a perimeter of the peripheral surface, and an o-ring disposed in and retained by the groove such that the o-ring contacts the inner sidewall so as to prevent fluid from exiting the bottle when the butterfly valve is in the closed position.

In an embodiment, the o-ring is configured to enable the butterfly valve to be positioned in a variable position between the closed position and a maximum open position.

In an embodiment, the o-ring is a contrasting color from a color of the disc shaped member, thereby enabling a user to readily observe that the butterfly valve is in the open position.

In an embodiment, the butterfly valve further includes a pivot point disposed substantially in the middle of an opening of the open end of the vessel portion of the beverage bottle.

In an embodiment, the cap includes a sidewall and a lip at the top of the sidewall, the sidewall being higher on a front side than a back side, and wherein the butterfly valve is oriented to allow fluid to exit from the front side.

In an embodiment, a top of the butterfly valve is below the lip on the back side of the sidewall.

In an embodiment, the cap further includes a butterfly valve support structure to which the butterfly valve engages.

In an embodiment, the butterfly valve support structure includes pivot posts extending from the butterfly valve, and wherein said butterfly valve member includes a pair of pivot point structures that extend opposite sides of a sidewall of said butterfly valve member, said pivot point structures configured to enter the rotation member supports to enable said butterfly valve member to rotate from a closed position to an open position and vice versa.

In an embodiment, a bottle cap comprises: (a) a body with (1) an inner sidewall defining an opening through which liquid can flow, and (2) an attachment structure for attaching the core to a neck of a bottle; and (b) a butterfly valve positioned within the opening and received in pivoting engagement with the core and enable to pivot between open and closed positions.

In an embodiment, the core further includes pivot stops that control an extent of pivoting of the butterfly valve by defining the open and closed positions for the butterfly valve.

In an embodiment, the body includes a splash guard located at one side of the opening to prevent liquid from flowing over the butterfly valve when the butterfly valve is in the open position.

In an embodiment, the splash guard includes a vent hole that is exposed to atmosphere with the butterfly valve is in the open position.

In an embodiment, the butterfly valve carries an o-ring about a perimeter thereof that provides a seal between the butterfly valve and the sidewall when the butterfly valve is in the closed position.

In an embodiment, the body includes an outer shell within which is received the body.

In an embodiment, the body is made of plastic and the outer shell is made of a metallic material.

In an embodiment, the bottle cap includes: (a) internal pivot stops that control an extent of pivoting of the butterfly valve by defining the open and closed positions for the butterfly valve; and (b) a splash guard located internally and at one side of the opening to prevent liquid from flowing over the butterfly valve when the butterfly valve is in the open position, wherein, the body, the pivot stops, and the splash guard are a unitary member.

In an embodiment, the bottle cap includes an outer shell within which is received the body, wherein, the body is made of plastic and the outer shell is made of a metallic material.

In an embodiment, an assembly comprises a bottle and a bottle cap according to any of the embodiments mentioned above.

In an embodiment, a method of manufacturing a bottle includes: (a) providing a butterfly valve member having a top side, a bottom side, and a sidewall extending between the top and bottom sides, the sidewall defining a groove that encircles the perimeter of the butterfly valve member; (b) retaining an o-ring by the groove of the butterfly valve member; (c) engaging the butterfly valve member with a butterfly valve support structure; (d) engaging the butterfly valve support structure with a cap frame; and (e) engaging the cap frame with a vessel portion of the bottle.

In an embodiment, engaging the butterfly valve member with a butterfly valve support structure includes inserting pivot point members of the butterfly valve member into pivot point structures of the butterfly valve support structure to enable rotation of the butterfly valve member.

In an embodiment, engaging the butterfly valve support structure with the cap frame includes pressing the butterfly valve support structure into the cap frame.

In an embodiment, engaging the butterfly valve support structure includes aligning the butterfly valve support structure such that the butterfly valve member opens toward a sip region below a front lip of the cap frame.

In an embodiment, engaging the butterfly valve member with the butterfly valve support structure includes engaging pivot point members of the butterfly valve member with pivot point structures of the cap frame.

BRIEF DESCRIPTION OF THE DRAWINGS

Illustrative embodiments of the present invention are described in detail below with reference to the attached drawing figures, which are incorporated by reference herein and wherein:

FIG. 1A is a rear perspective view of an illustrative drink-through cap with a butterfly valve in a closed position on an illustrative beverage bottle;

FIG. 1B is a rear perspective view of the drink-through cap of FIG. 1A with the butterfly valve in a closed position;

FIG. 2A is a cross sectional view of an illustrative drink-through cap with a butterfly valve in its open position;

FIG. 3A is a perspective view of another illustrative drink-through cap with a butterfly valve;

FIG. 3B is a perspective view of the illustrative drink-through cap of FIG. 3A with the butterfly valve removed; and FIG. 4 is a flow chart for an illustrative method of assembly of a drink-through cap with a butterfly valve.

DETAILED DESCRIPTION OF THE DRAWINGS

Figure 1D:
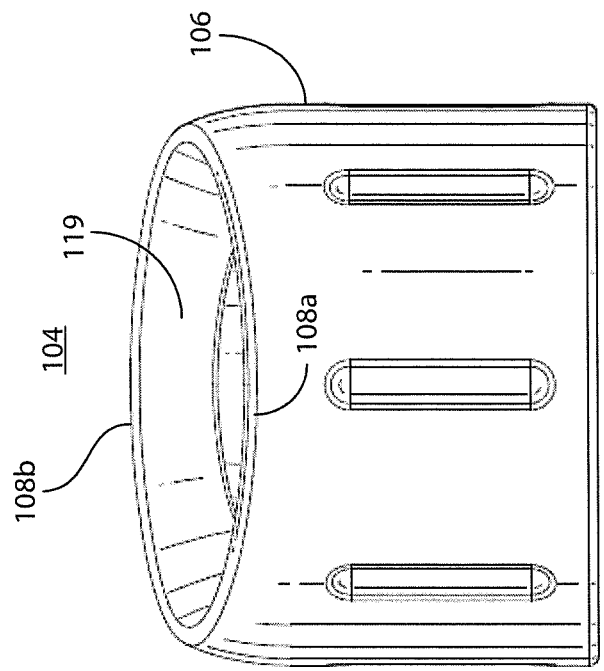
FIG. 1D is a rear elevational view of the drink-through cap of FIG. 1A.

In FIG. 1A, there is depicted an illustrative beverage bottle 100 for use by a user. The beverage bottle 100 may include a container or vessel portion 102 and a cap 104 configured to enable the user to drink fluid contained in the beverage bottle without removing the cap 104 from the vessel portion 102. The cap 104 may include a cap frame, shell, or outer skin 106 that defines an outside portion of the cap 104 as explained in greater detail below in connection with FIGS. 2A-2B. The cap 104 may include a back lip 108a and a front lip 108b, where the back lip 108a is lower than the front lip 108b relative to a horizontal plane. In an alternative embodiment, the front lip 108a and back lip 108b are the same height. Alternative configurations of the front and back lips 108a and 108b may be utilized.

The cap 104 also includes a lid 110. The lid 110 may be formed from or operate as a butterfly valve to enable the lid 110 to toggle between a closed and an open position. To support and enable the lid to toggle, pivot or rotation points 112a and 112b may be included. A user may toggle the lid 110 from a closed position to an open position by pressing on a back lid portion 114a, which causes a front lid portion 114b to pivot upwards. Opening the butterfly valve, of course, allows fluid to flow from the vessel portion 102 via the lid 110. Conversely, to close the lid 110, the user may press on the front lid portion 114b, which closes the butterfly valve, thereby preventing fluid to flow from the vessel portion 102 via the lid 110. In an embodiment, the lid 110 may be configured to provide for variable degrees of openness (e.g., 10%, 25%, 50%, 75%, 100%, or otherwise). As a result of using an o-ring (see FIG. 2A) around the lid 110, variable adjustability may be set through friction created by the o-ring. By having a lower rear lip 108a, the user may more easily open the lid 110.

The cap 104 may include ribs 116a-116n (collectively 116) disposed on the frame 106. The ribs 116 provide both strength and ornamental appearance for the cap frame 106 by hardening the material (e.g., metal) used to form the cap frame 106. The ribs 116 also provide for ornamental features. It should be understood that the ribs 116 may have alternative shapes and dimensions than those shown. It should also be understood that the cap frame 106 may be absent of the ribs 116 such that the cap frame 106 is plain and featureless.

In one embodiment, a feature 118 may be disposed on a top surface of the lid 110. The feature 118 is shown to be circular in this embodiment. However, the feature 118 may be any other shape, such as a shape of a logo or other geometrical or non-geometrical shape so as to be ornamental in nature. The feature 118 may also provide a sense of where the toggle position for a user by feeling the feature 118. The feature 118 is shown to be an indentation. In an alternative embodiment, the feature 118 may be a protrusion. In yet another embodiment, the feature 118 may be a combination of protrusion(s) and indentation(s).

With regard to FIG. 1B, a rear perspective view of the drink-through cap 104 of FIG. 1A with the lid 110 in a closed position is shown. As previously described, because the lid 110 is positioned within the cap 104 at a position that is a lower than the front lip 108*b* or otherwise at a height that is at or below a height of the back lid portion 114*a*, a user of the bottle 100 may easily operate the lid 110 with a single hand, thereby freeing up the other hand of the user. Because the front lip 108*b* is at a height above the top of the front lid portion 114*b*, the user may use a sip region 119 of the cap 104 when drinking from the bottle 100. Upon completion of drinking from the bottle, the user may press the front lid region 114*b* to close the lid 110. Again, because the lid 110 is configured and operates as a butterfly valve, the user may more easily operate the lid 110 so as to be able to use a single hand when using the bottle 100.

Figure 1C:
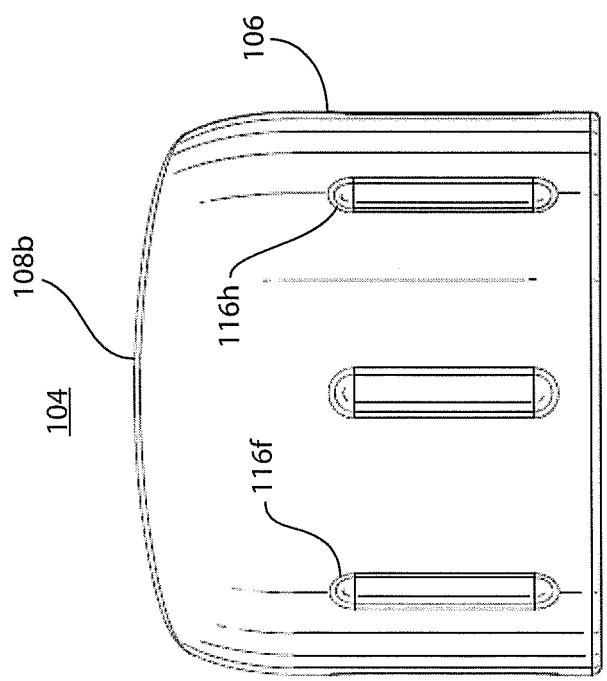
FIG. 1C is a front elevational view of the drink-through cap of FIG. 1A.

With regard to FIG. 1C, a front elevational view of the drink-through cap 104 of FIG. 1A. As shown, the front lip 108*b* extends above the front lid portion 114*a*, thereby providing a sip region 119 (FIG. 1B) so as to enable the user to drink from an exposed portion of the cap 104 rather than directly from the drink-through lid 110. Having the sip region 119 also enables the use of the butterfly valve that provides a variable opening that enables the user to control or meter the amount and/or rate of flow of fluid from the bottle 100.

With regard to FIG. 1D, a rear elevational view of the drink-through cap 104 of FIG. 1A is shown. The sip region 119 is clearly seen as the rear lip 108*a* is below the front lip 108*b*, thereby providing for the user to drink from the cap 104.

Figure 1F:
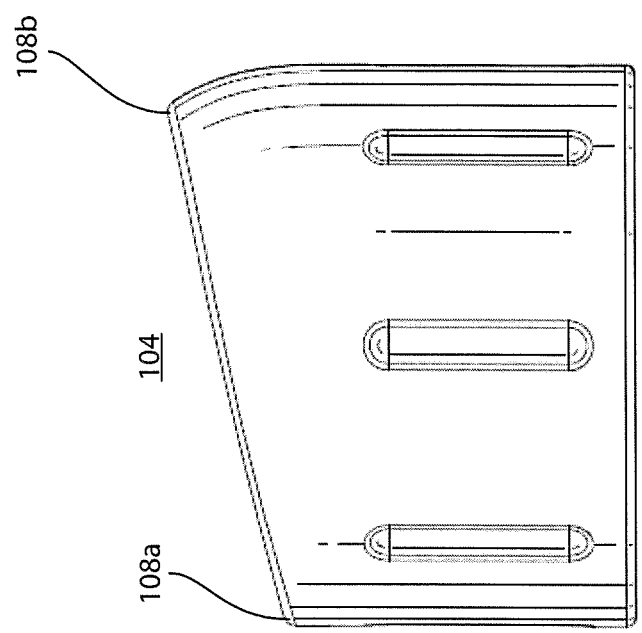
FIG. 1F is a left-side elevational view of the drink-through cap of FIG. 1A.
Figure 1E:
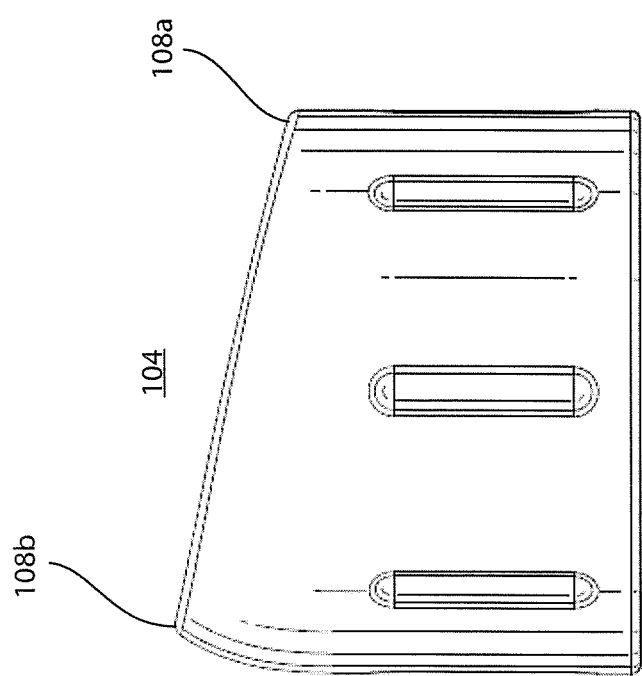
FIG. 1E is a right-side elevational view of the drink-through cap of FIG. 1A.

With regard to FIG. 1E, a right-side elevational view of the drink-through cap 104 of FIG. 1A is shown. With regard to FIG. 1F, a left-side elevational view of the drink-through cap 104 of FIG. 1A is shown.

Figure 1G:
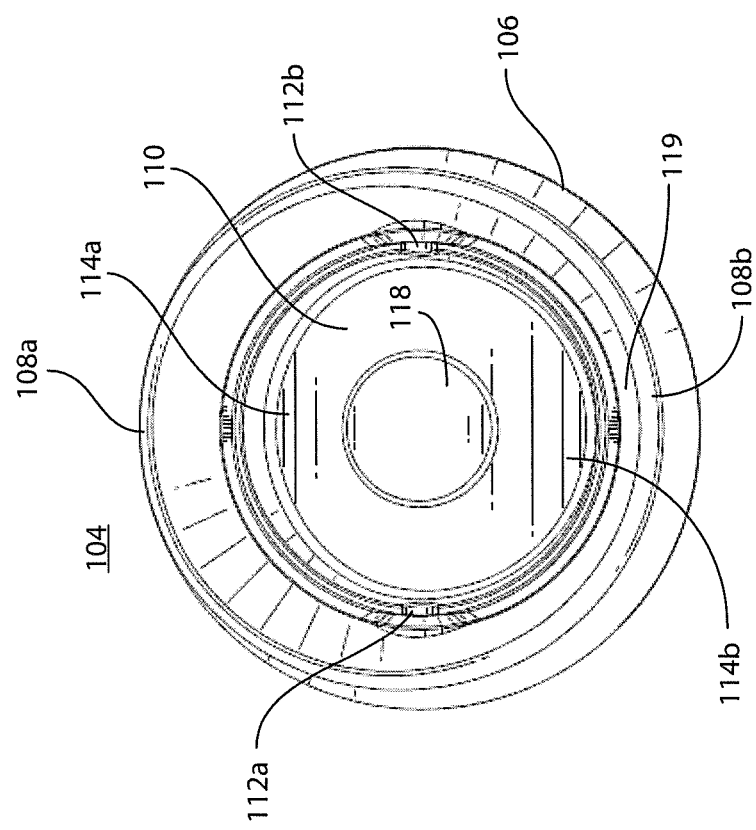
FIG. 1G is a top view of the drink-through cap of FIG. 1A.

With regard to FIG. 1G, a top view of the drink-through cap 104 of FIG. 1A is shown. The sip region 119 is shown to be a steeper incline than an incline of the opposite side beneath the rear lip 108*a*. The steeper incline provides additional control of drinking a beverage from the cap 104 for the user, as such a steep incline is more consistent with conventional drinking cups.

Figure 1H:
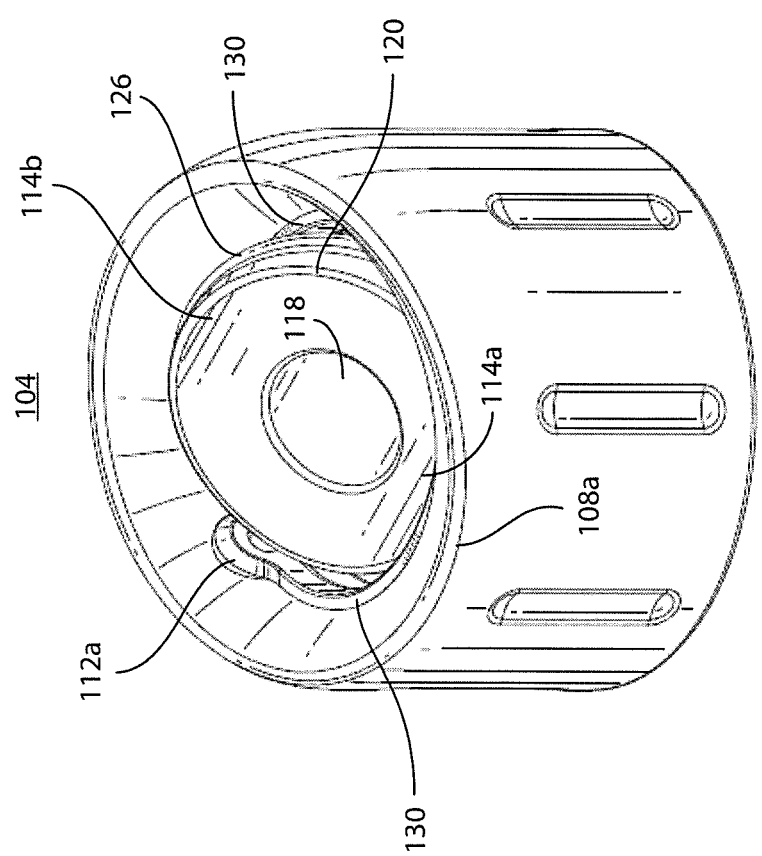
FIG. 1H is a rear perspective view of the drink-through cap of FIG. 1A with the butterfly valve in an opened position.

With regard to FIG. 1H, a rear perspective view of the drink-through cap 104 of FIG. 1A with the lid 110 in an opened position is shown. The back lid portion 114*a* is tilted downwards and below an inside lip 130 of the cap 104. The front lid portion 114*b* is tilted upwards and above the inside lip 130. In the open position, liquid within the bottle may pass through the lid 110.

With reference to FIGS. 2A-2D more details and aspects of the technology disclosed herein are described.

In FIG. 2A there is shown in cross section an illustrative drink-through cap 200 that incorporates the features of the cap 104. The cap 200 includes an inner core 202 inside of an outer frame, skin or shell 204. The inner core 202 preferably is made of a durable molded plastic such as polypropylene. The outer shell is made of a durable material, preferably a metal such as stainless steel or aluminum, and more preferably, stainless steel. The stainless steel can be brushed or painted.

The inner core 202 preferably has a tubular skirt 206 with an interior surface 208 with integrally molded threading 210 for threading engagement with mating threading on the neck of a container, such as bottle 102 shown in FIG. 1A. However, other mating structures, such as quick disconnect structures are contemplated.

Further, while a structure having an inner core received within an outer shell is preferred and described in detail herein, it can be appreciated that the inner core can be formed with an exterior that is similar to the exterior of the outer shell, such that a separate outer shell is not necessary. However, when an outer shell made of a durable material such as a metallic material, and preferably stainless steel, such an outer shell can provide extra protections against damage such a dings and the like or other wear and tear, and such a shell can provide a more sanitary surface from which to drink. Thus, as used herein and in the claims, a cap "body" can mean just a member such as a inner core, or inner core-like member, or the combination of an inner core and an outer shell.

The inner core 202 has an upper end 212 from which extends an inner lip 213. The inner lip 213 extends from a circular inner sidewall 214 that surrounds and defines a periphery of an opening 215 in the cap 200. The lip 213 together with a sip portion of the outer shell 204 provide what is mentioned above as inner lip 130.

As illustrated the sidewall 214 is generally vertical or parallel to a longitudinal axis of the cap 200. In contrast, the inner lip 213 is a bevel and has an oblique angle relation to vertical or the longitudinal axis of the cap 200.

The upper end 212 includes a bight 216 joining and bridging the inner sidewall 214 and the tubular skirt 206. An underside of the bight 216 includes a circular groove 218 into which is received a rim of an opening of the bottle. These features are all integrally molded together to form the unitary inner core 202.

Supported within the opening 215 is pivoting lid or a butterfly valve 220 which includes an upper or top wall 222 exposed to/from the opening, and a peripheral sidewall 224. Preferably, the opening 215 and the valve 220 are both circular in horizontal cross section. However, it can be appreciated that they can have other cross sectional shapes such as polygonal shapes and complex shapes. In all instances, it is preferable that the valve 220 be supported so as to pivot about a center pivot line thereof, although pivot lines other than at the center of the valve are encompassed by the technologies disclosed herein.

As illustrated, the valve 220 includes two pivot posts 226 extending in opposite directions from the pivot line of the valve. These posts engage and extend into openings or holes the sidewall 214 of the opening 215. Posts 326 such as posts 226 can be seen in perspective view in connection with the embodiment of FIGS. 3A and 3B.

Preferably, the posts 226 include rounded ends and lengths such that the valve can be popped into engagement with the holes 228 and popped out of the holes 228 with some ease to enable removal of the valve 220 for cleaning purposes. Yet, when the valve 220 is popped into place, the engagement is such that the valve 220 is sufficiently secured so as not to pop out of engagement without sufficient human effort or its equivalent. That is to say, the weight of liquid in the bottle is not sufficient to cause the valve to disengage. Alternatively, the posts may have squared ends.

As can be appreciated, alternatively, the valve 220 could have two holes or depressions in its peripheral sidewall 224, and posts could extend from the sidewall 214 into the openings.

As further illustrated, the valve 220 further includes a peripheral groove or rabbet 230 about the peripheral sidewall 224 within which is received a gasket or o-ring 232. As can be appreciated, the sidewall is dimensioned to not have an outside diameter greater than the diameter of the opening 215 and the gasket or o-ring 232 provides a seal between the sidewall 214 and the sidewall 224 when the valve is in the closed position. The gasket or o-ring 232 preferably is made our of rubber or silicon or any other suitable material. The gasket or o-ring 232 may have be of a different color than the sidewall 224. Preferably the sidewall 220 and the o-ring 232 are of contrasting colors so that the o-ring 232 is easily visible when the valve 220 is in the open position.

While valve 220 may be shaped like a solid button. However, in the illustrated embodiment, the valve 220 is molded with an hollow underside. Thus, the sidewall 224 is tubular. This reduces the amount of material in the valve 220 and reduces the weight of the valve. As such, the valve 220 has an overall screw-on or crimp-on bottle cap shape.

For reasons that will be better appreciated below, the peripheral sidewall is asymmetrical about the pivot line of the valve. As best seen in FIG. 2A, a front portion 224a which extends forward of the pivot line toward the front or drinking lip of the cap 200 has a first relatively shorter height, while rear portion 224b which extends aft of the pivot line toward the rear lip of the cup 200 has a second relatively longer height. Thus, the valve 220 is thinner at the front portion 224a than the rear portion 224b.

The greater thickness of the valve 220 is due to two differences. Given a horizontal line through the valve 220 when it is in its closed position, the sidewall in the aft portion 224b extends higher than the top surface in the front portion 224a. Similarly, the sidewall 224 extends farther below the horizontal line in the aft portion 224b than it does in front portion 224a.

The greater height of the top surface in the aft portion 224b facilitates opening of the valve 220 by a finger of a hand holding the bottle by the cap 220. The valve is easier to reach, and more leverage can be applied by the finger.

The peripheral sidewall 224 preferably has an exterior peripheral surface 234 shaped so that the valve 220 has a small gap 235 between the exterior surface 234 and remaining structure of the inner core that is maintained throughout the entire arc of travel of the valve 220 as it pivots between the closed position and the open position, and vice versa. Of course, this gap 235 is slightly less than the amount of the gasket or o-ring 232 that protrudes from the rabbet 230, at least when the valve 220 is in the closed position.

An upper or top surface 238 of the top wall 222 of the valve 220 is contoured to be smoothly concave. This enables greater contact surface area between a finger and the surface 238 as the contour better conforms to the rounded shape of a finger tip. With the greater contact surface area, the pressure borne by the depression action of a finger tip is more distributed over the surface 238, and hence the valve 220, thereby facilitating an easier and smoother rotation of the value about its pivot points.

To control or define the open and closed positions of the valve 220, the inner core 202 includes integrally molded stops 240 and 242 on each of opposite sides of the inner core 208 interior surface. The stops 240 provide horizontal surfaces 240a on which the valve 220 sits or rests when in the closed position. The stops 242 provide relatively oblique surfaces 242a on which the valve 220 rests or sits on when in the open position. In this embodiment, the stops 240 and 242 are molded as a single continuous member projecting out from a bottom edge of the sidewall 214 and from the interior surface 208, respectively. However, they can be separate from each other. Because the stops should not unduly impede the flow of liquid they only extend out into the opening 215 an amount sufficient to provide the stop functions.

Figure 2B:
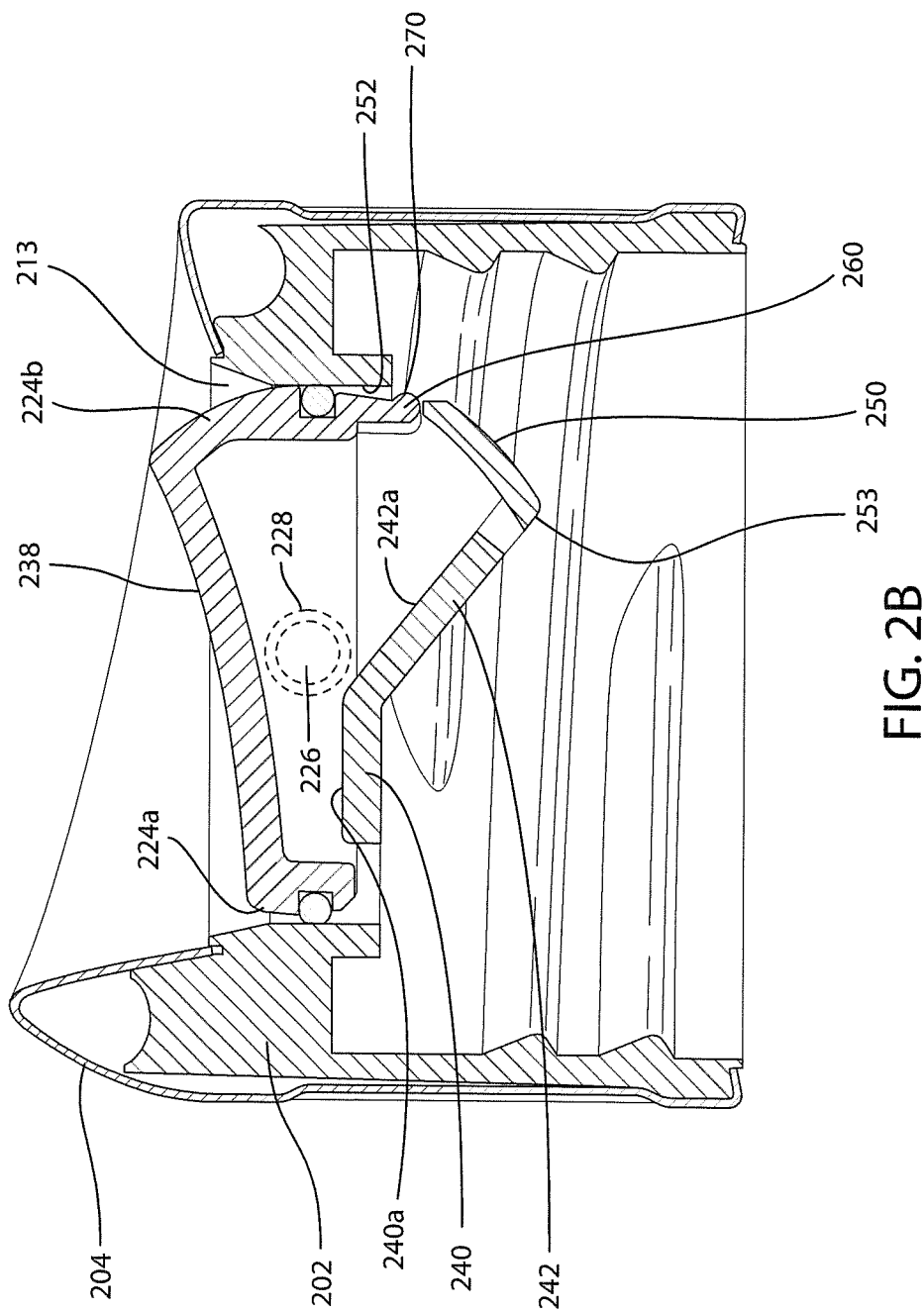
FIG. 2B is a cross sectional view of the illustrative drink-through cap of FIG. 2A with the butterfly valve in its closed position.

To prevent liquid from flowing over the valve 220 when the bottle is tilted and the valve 220 is in the open position, the inner core 202 preferably includes an integrally molded splash guard 250. The splash guard 250 is located at the rear of opening 215 of the cap 200. As can be seen in FIGS. 2A and 2B, The splash guard 250 has a curved exterior surface 252 that faces the valve 220. The surface 252 is curved to provide a concave surface that accommodates the convex curved exterior surface 234 of the sidewall 224 of the valve 220. The curvature of the surface 252 of the splash guard 250 is not constant, rather it changes (decreases) proceeding from a bottom edge 253 to the inner sidewall 214 so that the gap between the exterior 232 of the valve sidewall 214 and the splash guard 250 is larger at the inner sidewall 214 than at the bottom edge 253 when the valve is in the open position.

The splash guard 250 includes a vent hole 260 at the bottom edge of the inner sidewall 214 of the opening 215. The vent hole 260 is exposed to atmosphere when the valve 220 is in the open position and provides for ingress of air into the bottle while liquid is outflowing to prevent the build up of a vacuum, thereby smoothing the outflow of the liquid. The gap between the value 220 and the splash guard 250 enables air to enter the vent hole 260. The gap, therefore, is sized to allow the entry of air into the vent hole 260, yet have the valve cover most of the splash guard. The vent hole 260 is shown as preferably rectangular, but other shapes are contemplated.

The valve 220 and splash guard 250 also include features providing snap functions for locking the valve in its open and closed positions. At the bottom edge of the aft portion 224b of the sidewall 224, the sidewall includes a bulge 270. In this embodiment, the bulge is rounded and in cross section imparts a slight hook shape or reverse clef note shape. The bulge 270 protrudes an amount slightly more than the gap between the exterior surface 232 of the sidewall 224 and the splash guard 250, at the lower end of the splash guard. As a result, the bulge actually touches and provides some resistance to pivoting of the valve. However, the resistance is slight enough that it can be easily overcome by the finger of a user. Thus, when pivoting to the open position, the bulge 270 rubs against the splash guard 250. However, once the bulge 270 is pivoted past the splash guard 250, it juts out beyond the lower edge 253 of the splash guard with a snapping action. The valve is then held in the open position by the bulge 270.

When the valve 220 is pivoted to the closed position, the user will exert a force sufficient to overcome the resistance of the bulge 270 and the bulge 270 will again travel in contact with the splash guard 250. The roundness of the bulge facilitates the ability of the force to overcome the resistance and hooking action of the bulge 270 on the bottom edge of the splash guard 250. When the valve 220 reaches the closed position, the bulge snaps into the vent hole 260 and secures the valve 220 in the closed position.

Because of the lesser thickness of the front portion 224a of the sidewall 224, and in particular the lesser extent to which it extends below the horizontal line described above, when the valve 220 is in the open position, a greater gap is provided between the inner sidewall 214 and the valve 220. This enables greater liquid flow out of the cap 220.

Figure 2D:
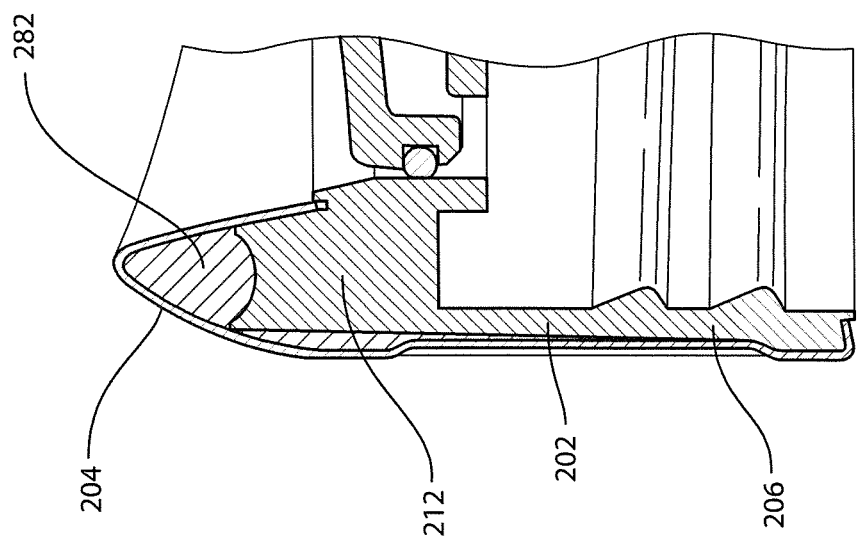
FIG. 2D is a cross sectional view of a detail of an illustrative drink-through cap with sealant.
Figure 2C:
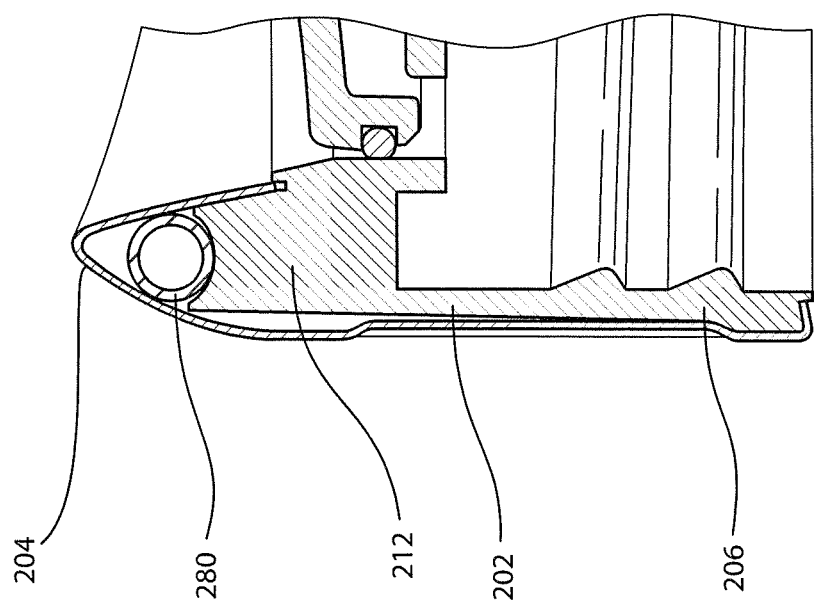
FIG. 2C is a cross sectional view of a detail of a an illustrative drink-through cap with a gasket.

FIGS. 2C and 2D illustrate a detail that may be included in the cap 200. In both figures, it can be seen that there might be a gap between the shell 204, and the inner core 202 just above the bight 212. In FIG. 2C, this gap is shown partially filled by a gasket or o-ring 280. In FIG. 2D, this gap is shown filled by a sealant 282 such as silicon sealant.

In FIGS. 3A-3C there is illustrated another style of cap that embodies principles of the technology disclose herein. In this cap 300, a relatively wide outer lip 302 is not angled, nor is the rim provided with different forward and aft heights to provide a drinking lip. Rather, the cap 300 is provided with an internal recess or channel 304 within the lip 306. This recess effectively serves as a spout.

Otherwise, the butterfly valve 320 and the remaining inner core struction are constructed in a manner similar to that of the valve 220 and the inner core 202, and thus are not further discussed in a much detail herein.

In FIG. 3B, one can easily see stops 340 and 342 and splash guard 350. Also, a valve 330 is shown in perspective in view with its pivot posts 332 and 334.

Just like the valves 110 and 220, the top surface of the butterfly valve member 320 may define a feature 338, such as an indentation or protrusion, that provides for a user to feel where the center of the top surface of the butterfly valve 320 exists. The feature 338 may also provide for a decorative or ornamental aspect of the bottle. Because the butterfly valve 320 is a single element, cleaning of the valve 320 and cap 300 is easy and no special tools are needed to perform the cleaning as, at least in one embodiment, no hidden cavities exist, which is contrary to typical beverage bottles. Moreover, disassembly of the cap 300 for cleaning or repair is also easy for users as the number of elements are 2 or 3 depending on whether the user disassembles the o-ring from the butterfly valve 320.

With regard to FIG. 4, an illustrative process 400 of assembling a drink-through cap is shown. The process 400 may start at step 402 by providing a butterfly valve member having a top side, a bottom side, and a sidewall extending between the top and bottom sides. The sidewall may define a groove that encircles the perimeter of the butterfly valve member. At step 404, an o-ring may be retained by the groove of the butterfly valve member. The butterfly valve member may be engaged with a butterfly valve support structure at step 406. At step 408, the butterfly valve support structure may be engaged with a cap frame, and at step 410, the cap frame may be engaged with a vessel portion of the bottle so as to form a completed bottle.

In engaging the butterfly valve member with a butterfly valve support structure, pivot point members may be inserted into pivot point structures of the butterfly valve support structure to enable rotation of the butterfly valve member. The butterfly valve support structure may be engaged with the cap frame by pressing the butterfly valve support structure into the cap frame. Engaging the butterfly valve support structure may include aligning the butterfly valve support structure such that the butterfly valve member opens toward a sip region below a front lip of the cap frame. The butterfly valve member may be engaged with the butterfly valve support structure by engaging pivot point members of the butterfly valve member with pivot point structures of the cap frame.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present disclosure is not intended to be limited to the embodiments shown herein but is to be accorded the widest scope consistent with the following claims and the principles and novel features disclosed herein.

The previous description is of one or more preferred embodiments for implementing the disclosed technologies, and the scope of the disclosure should not necessarily be limited by this description. The scope of the present disclosure is instead defined by the following claims.

What is claimed:

1. A beverage bottle, comprising:
   a vessel portion configured to contain fluid, the vessel portion including an upper end comprising a vessel opening and a lower closed end; and
   a cap configured to mate with the upper end of the vessel portion, the cap including:
      a front portion comprising a front lip and a back portion comprising a back lip,
      an outer sidewall extending about a periphery of the cap between the front portion and the back portion and defining a height of the cap at the back lip and a height of the cap at the front lip,
      an inner sidewall that defines a periphery of a cap opening extending through the cap and through which the fluid may flow from the beverage bottle when the cap is mated with the vessel portion, and
   a butterfly valve comprising a valve sidewall defining an outer periphery of the butterfly valve, wherein the butterfly valve seats within the cap opening such that the inner sidewall of the cap is adjacent to and extends around the valve sidewall, wherein the butterfly valve is configured (i) to seal the cap opening to prevent the fluid from exiting the beverage bottle when the butterfly valve is in a closed position and (ii) to unseal the cap opening to enable the fluid to exit the beverage bottle when the butterfly valve is in an open position.

2. The beverage bottle according to claim 1, wherein:
   said butterfly valve includes a disc shaped member having a top surface and a bottom surface, wherein the valve sidewall extends between the top surface and the bottom surface of the disc shaped member, the butterfly valve further including a groove extending along the valve sidewall, and an o-ring disposed in and retained by the groove such that the o-ring contacts the inner sidewall of the cap so as to prevent fluid from exiting the beverage bottle via the cap opening when the butterfly valve is in the closed position.

3. The beverage bottle according to claim 2, wherein the o-ring is configurable to enable the butterfly valve to be positioned in a variable position between the closed position and a maximum open position.

4. The beverage bottle according to claim 2, wherein the o-ring is a contrasting color from a color of the disc shaped member, thereby enabling a user to readily observe that the butterfly valve is in the open position.

5. The beverage bottle according to claim 2, wherein when the cap is mated with the upper end of the vessel portion, said butterfly valve includes a pivot point disposed substantially in a middle of the vessel opening.

6. The beverage bottle according to claim 1, wherein the height of the cap at the front lip is greater than the height of the cap at the back lip, and wherein the butterfly valve is oriented to allow the fluid to exit the beverage bottle from the front portion of the cap.

7. The beverage bottle according to claim 1, wherein said cap further includes a butterfly valve support structure and wherein the butterfly valve is supported within the cap opening via the butterfly valve support structure.

8. The beverage bottle according to claim 7, wherein said butterfly valve comprises a hail pair of pivot posts that extend outwardly from opposite sides of said butterfly valve, and wherein the butterfly valve support structure receives the pair of pivot posts to enable said butterfly valve to rotate from the closed position to the open position and vice versa.

9. The beverage bottle of claim 1, wherein the cap includes a splash guard located at one side of the cap opening to prevent liquid from flowing over the butterfly valve when the butterfly valve is in the open position, and wherein the splash guard includes a vent hole that is exposed to atmosphere when the butterfly valve is in the open position.

10. The beverage bottle of claim 1, wherein the butterfly valve further comprises a back valve portion and a front valve portion, wherein in the open position the back valve portion extends within and at least partially through the cap opening such that the front valve portion extends above the back valve portion.

11. A bottle cap comprising:
a body comprising a front portion, a back portion, and a periphery defined by an outer sidewall extending between the front portion and the back portion of the body, and an inner sidewall defining a periphery of a cap opening passing through the body; and
a butterfly valve comprising a valve sidewall defining an outer periphery of the butterfly valve, wherein the butterfly valve seats within the cap opening such that the inner sidewall of the body is adjacent to and extends around the valve sidewall, wherein the butterfly valve is configured (i) to seal the cap opening when the butterfly valve is in a closed position, and (ii) to unseal the cap opening when the butterfly valve is in an open position, wherein the butterfly valve is received in pivoting engagement with the body and is pivotable between the open position and the closed position.

12. The bottle cap of claim 11, wherein the body further includes at least one pivot stop that controls an extent of pivoting of the butterfly valve.

13. The bottle cap of claim 11, wherein the body further includes a splash guard located at one side of the cap opening.

14. The bottle cap of claim 13, wherein the splash guard includes a vent hole that is exposed to atmosphere when the butterfly valve is in the open position.

15. The bottle cap of claim 11, wherein the butterfly valve carries an o-ring about the valve sidewall that provides a seal between the butterfly valve and the inner sidewall of the body when the butterfly valve is in the closed position.

16. The bottle cap of claim 11, further comprising:
at least one internal pivot stop that controls an extent of pivoting of the butterfly valve; and
a splash guard located internally and at one side of the cap opening,
wherein the body, the at least one internal pivot stop, and the splash guard are a unitary member.

17. The bottle cap of claim 16, further comprising an outer shell within which is received the body, wherein the body comprises plastic and the outer shell comprises a metallic material.

* * * * *